United States Patent
Salley et al.

(10) Patent No.: US 7,650,736 B1
(45) Date of Patent: Jan. 26, 2010

(54) CENTER CONVEYOR FRONT COUPLER FOR A DRAPER CUTTING PLATFORM

(75) Inventors: Gordon L. Salley, Moline, IL (US); Joseph Oberlander, Parkview, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 12/173,932

(22) Filed: Jul. 16, 2008

(51) Int. Cl.
*A01D 43/00* (2006.01)
(52) U.S. Cl. .......................................................... 56/181
(58) Field of Classification Search .................... 56/181, 56/208, 16.4 R; 460/20, 16; 198/601, 513, 198/523
See application file for complete search history.

(56) References Cited

U.S. PATENT DOCUMENTS

| | | | | |
|---|---|---|---|---|
| 2,389,193 A * | 11/1945 | Graves | ........................ | 198/601 |
| 2,999,348 A * | 9/1961 | Cunningham | ............ | 56/16.4 R |
| 4,429,517 A * | 2/1984 | Lohrentz et al. | .............. | 56/181 |
| 4,845,931 A * | 7/1989 | Bruner et al. | .................. | 56/208 |
| 4,956,966 A * | 9/1990 | Patterson | ....................... | 56/181 |
| 5,005,343 A * | 4/1991 | Patterson | ..................... | 56/14.4 |
| 5,464,371 A * | 11/1995 | Honey | .......................... | 460/20 |
| 6,029,429 A * | 2/2000 | Fox et al. | ................... | 56/10.2 E |
| 6,202,397 B1 | 3/2001 | Watts et al. | | |
| 6,675,568 B2 * | 1/2004 | Patterson et al. | .............. | 56/208 |
| 6,817,166 B2 * | 11/2004 | Dunn | ....................... | 56/16.4 R |
| 6,865,871 B2 * | 3/2005 | Patterson et al. | .............. | 56/181 |
| 7,444,798 B2 * | 11/2008 | Patterson et al. | .............. | 56/181 |
| 2007/0193243 A1 | 8/2007 | Schmidt et al. | | |
| 2008/0161077 A1 * | 7/2008 | Honey | ......................... | 460/106 |

* cited by examiner

*Primary Examiner*—Árpád Fábiá-Kovács
(74) *Attorney, Agent, or Firm*—Taylor & Aust, P.C.

(57) ABSTRACT

A draper cutting platform for use with an agricultural harvester includes a pair of side platform sections, with each side platform section including a side belt. A center platform section is disposed in an area between the side platform sections. The center platform section includes at least one alignment device and at least one latch. A center conveyor assembly is removably attached to the center platform section, and carries a center belt. The center conveyor assembly includes at least one mating alignment device and at least one mating latch.

16 Claims, 7 Drawing Sheets

CENTER CONVEYOR FRONT COUPLER FOR A DRAPER CUTTING PLATFORM

FIELD OF THE INVENTION

The present invention relates to agricultural harvesters, and, more particularly, to agricultural combines including a draper cutting platform.

BACKGROUND OF THE INVENTION

An agricultural harvester such as a combine includes a head and a feeder housing which remove the crop material from the field, gather the crop material and transport the crop material to a separator. In the case of thinner stemmed crops such as soybeans, wheat, etc. which may be cut with a sickle bar carrying a plurality of knives, the head may also be known as a cutting platform. The separator removes the grain crop material from the non-grain crop material. The grain is cleaned and deposited in a grain tank. When the grain tank becomes full, an unloading auger which is positioned alongside the combine during harvesting is moved to the unloading position in which the auger extends approximately perpendicular to the longitudinal axis of the combine. The combine drives alongside a vehicle into which the grain is to be unloaded, such as a semi-trailer, and the unloading auger is actuated to discharge the grain into the vehicle.

A cutting platform may generally be of two types. One type typically has a sheet metal floor with a dual feed auger near the rear of the cutting platform for feeding the crop material longitudinally to the feeder housing. A cutting platform of this type with auger feed is more common.

Another type of cutting platform, also known as a draper platform, utilizes a flat, wide belt, referred to as a draper or draper belt to convey crop material. The arrangement and number of belts vary among platforms. One style of draper platform has two side belts that convey crop material longitudinally, to the center of the platform, where a center belt moves the crop material laterally into the feeder housing. Each belt is wrapped around a pair of rollers, one being a drive roller and the other being an idler roller. An example of this type draper arrangement is disclosed in U.S. Pat. No. 6,202,397, which is assigned to the assignee of the present invention.

An advantage of a draper platform is that larger amounts of crop material can be transported without plugging, etc. For example, with wide platforms approaching 40 feet or even larger, the amount of crop material transported to the feeder housing can be substantial. With an auger feed platform, the crop material may bind between the auger and the back wall of the platform. In contrast, with a draper platform, the crop material is carried on top of the belt with less chance for plugging.

With a draper platform as described above, it is known to have a draper platform which may be operated either as a harvester or as a swather. When configured as a harvester, the center section in front of the feederhousing which carries the center belt is in place between the side sections. When configured as a swather, the center section is removed from the draper cutting platform. This allows the crop material from each side section to be deposited in the open area between the side sections, forming a windrow as the swather moves forward.

A problem with a removable center section on a draper platform is that it is difficult and time consuming to align and attach the center section to the frame and cutterbar assembly. This process typically takes multiple personnel to accomplish, and results in a loss in productivity.

What is needed in the art is a draper cutting platform which may be operated either as a harvester or a swather, with simple and fast conversion between the two.

SUMMARY OF THE INVENTION

The invention in one form is directed to a draper cutting platform for use with an agricultural harvester. The cutting platform includes a pair of side platform sections, with each side platform section including a side belt. A center platform section is disposed in an area between the side platform sections. The center platform section includes at least one alignment device and at least one latch. A center conveyor assembly is removably attached to the center platform section, and carries a center belt. The center conveyor assembly includes at least one mating alignment device and at least one mating latch.

The invention in another form is directed to an agricultural harvester, including a feeder housing and a cutting platform. The cutting platform includes a pair of side platform sections, with each side platform section having a side belt. A center platform section is disposed in an area between the side platform sections, and includes at least one alignment device and at least one latch. A center conveyor assembly is attached to the feeder housing and removably attached to the center platform section. The center conveyor assembly carries a center belt, and includes at least one mating alignment device and at least one mating latch.

The invention in yet another form is directed to a method of attaching a center conveyor assembly to a center platform section of a draper cutting platform, including the steps of: positioning a base unit of an agricultural harvester such that a center conveyor assembly mounted to the front of the base unit is in general alignment with a center platform section of the cutting platform; moving the base unit forward until at least one alignment device mounted to the center platform section engages with a corresponding at least one mating alignment device mounted to the center conveyor assembly; and latching the center conveyor assembly to the center platform section.

DETAILED DESCRIPTION OF THE INVENTION

Figure 1:
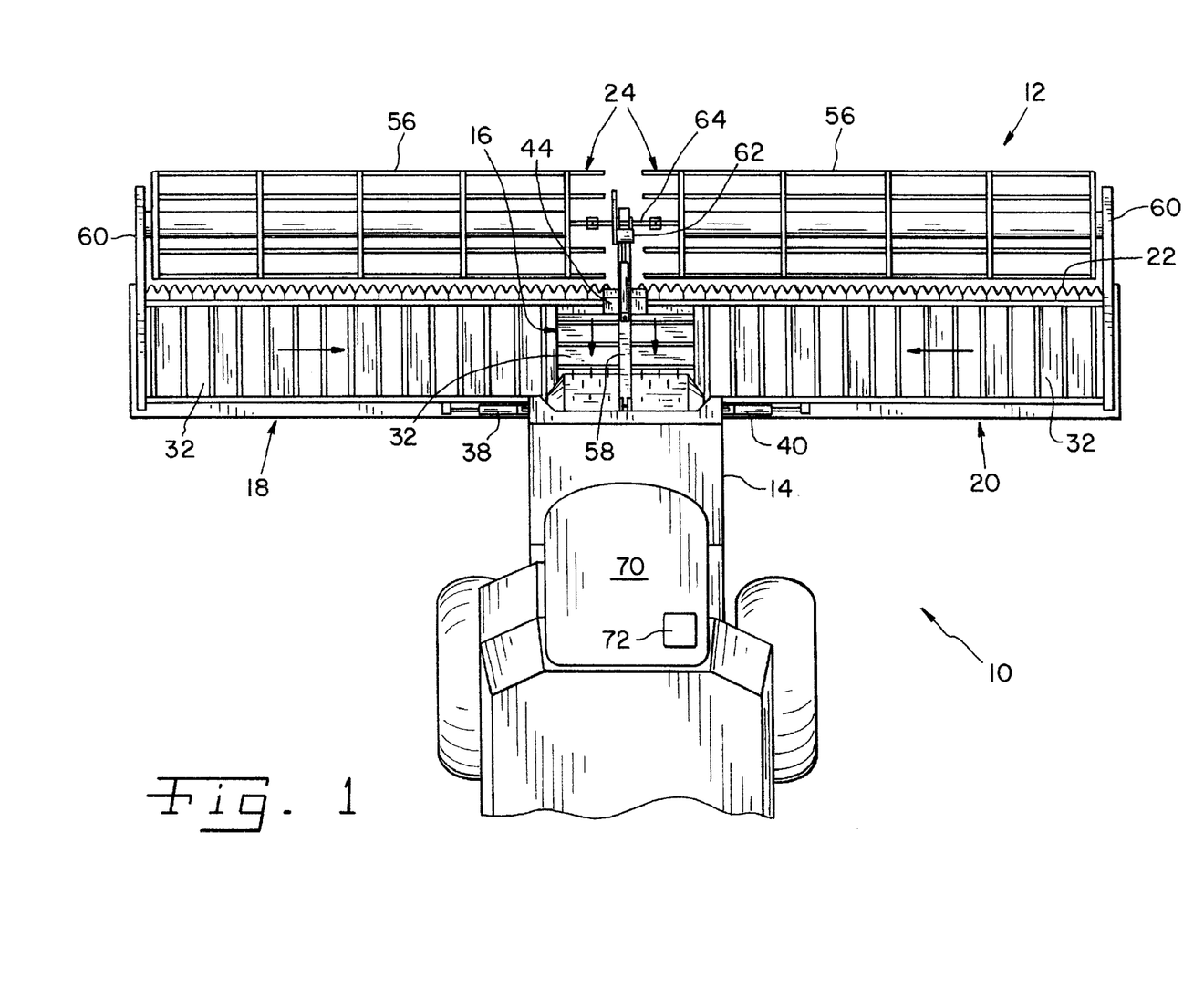
FIG. 1 is a fragmentary, top view of an agricultural combine including an embodiment of a draper platform of the present invention.
Figure 2:
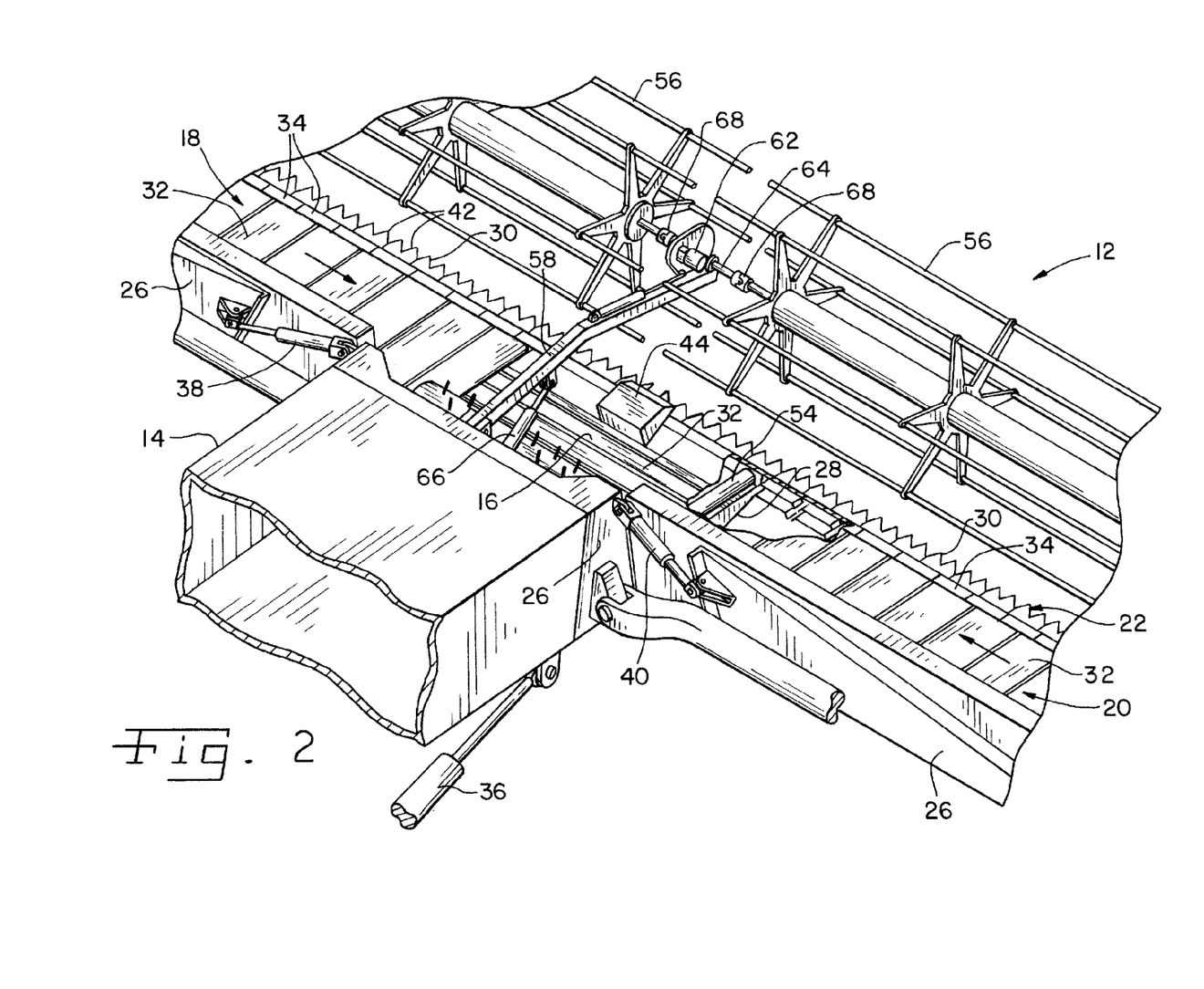
FIG. 2 is a fragmentary, perspective view of the agricultural combine of FIG. 1.

Referring now to the drawings, and, more particularly to FIGS. 1 and 2, there is shown an agricultural harvester in the form of a combine 10 including an embodiment of a cutting platform 12 of the present invention. Combine 10 includes a feeder housing 14 which is detachably coupled with cutting platform 12. Feeder housing 14 receives the crop material from cutting platform 12, both grain and non-grain crop material, and transports the crop material to a separator within combine 10 in known manner (not shown). The grain crop material is separated from the non-grain crop material, cleaned and transported to a grain tank. The non-grain crop material is transported to a chopper, blower, etc. in known manner and distributed back to the field.

Cutting platform 12 generally includes a plurality of platform sections 16, 18 and 20, a cutterbar assembly 22 and a reel assembly 24. In the embodiment shown, platform section 16 is a center platform section, platform section 18 is a first side platform section, and platform section 20 is a second side platform section. First side platform section 18 and second side platform section 20 are each configured as partially foldable wing sections in the illustrated embodiment, and thus may be referred to as wing platform sections hereinafter. It will be appreciated, however, that side platform sections 18 and 20 need not be partially foldable. Further, although shown with three platform sections, cutting platform 12 may be configured with more or less platform sections, depending upon the particular application.

Each platform section 16, 18 and 20 generally includes a frame 26, a plurality of float arms 28 coupled with a respective frame 26, a cutterbar assembly 22 carried by the outboard ends of respective float arms 28, and at least one endless belt 32 (FIG. 2). The frame 26 of first wing platform section 18 and second wing platform section 20 are each pivotally coupled with center platform section 16, such that the outboard ends of first wing platform section 18 and second wing platform section 20 can move up and down independent from center platform section 16. To that end, a lift cylinder 36 coupled between the frame of combine 10 and feeder housing 14 lifts the entire cutting platform 12, a first tilt cylinder 38 coupled between the respective frame 26 of first wing platform section 18 and center platform section 16 pivotally moves first wing platform section 18 relative to center platform section 16, and a second tilt cylinder 40 coupled between the respective frame 26 of second wing platform section 20 and center platform section 16 pivotally moves second wing platform section 20 relative to center platform section 16.

Reel assembly 24 includes two reels 56, center reel support arm 58 and a pair of outer reel support arms 60. Outer reel support arms 60 are pivotally coupled at one end thereof with an outboard end of a respective first wing platform section 18 or second wing platform section 20. Outer reel support arms 60 rotationally carry a respective reel 56 at an opposite end thereof. Each outer reel support arm 60 may be selectively moved up and down using a hydraulic cylinder, and the pair of hydraulic cylinders are typically coupled in parallel so that they move together upon actuation.

Center reel support arm 58 is pivotally coupled at one end thereof with center platform section 16 above the opening leading to feeder housing 14. Center reel support arm 58 rotationally carries an inboard end of each reel 56 at an opposite end thereof. A hydraulic motor 62 or other suitable mechanical drive rotationally drives each reel 56. More particularly, hydraulic motor 62 drives a common drive shaft 64 through a chain and sprocket or other suitable arrangement (not shown). The rotational speed of reels 56 can be adjusted by an operator by adjusting the rotational speed of hydraulic motor 62.

Center reel support arm 58 may be selectively moved up and down using a hydraulic cylinder 66. Center reel support arm 58 is movable independently from outer reel support arms 60. To accommodate this independent movement, drive shaft 64 driven by hydraulic motor 62 is coupled at each end thereof via a universal joint 68 with a respective reel 56. This independent movement of center reel support arm 58 can be accomplished manually using a separate actuating switch or lever in operator's cab 70, or automatically using an electronic controller 72 located within cab 70 or other suitable location.

Figure 3:
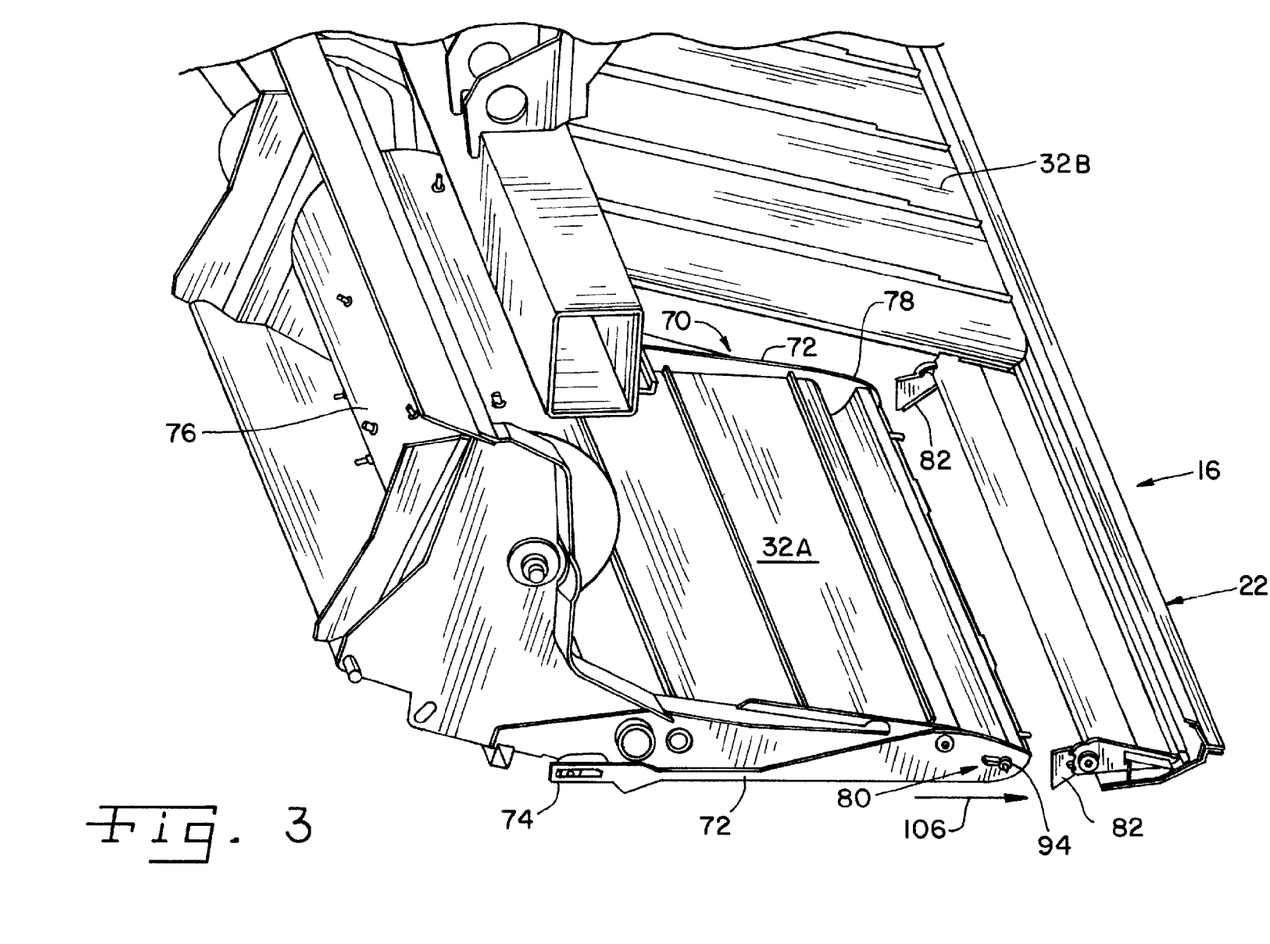
FIG. 3 is a fragmentary, perspective view of the center conveyor assembly positioned relative to the center platform section.
Figure 4:
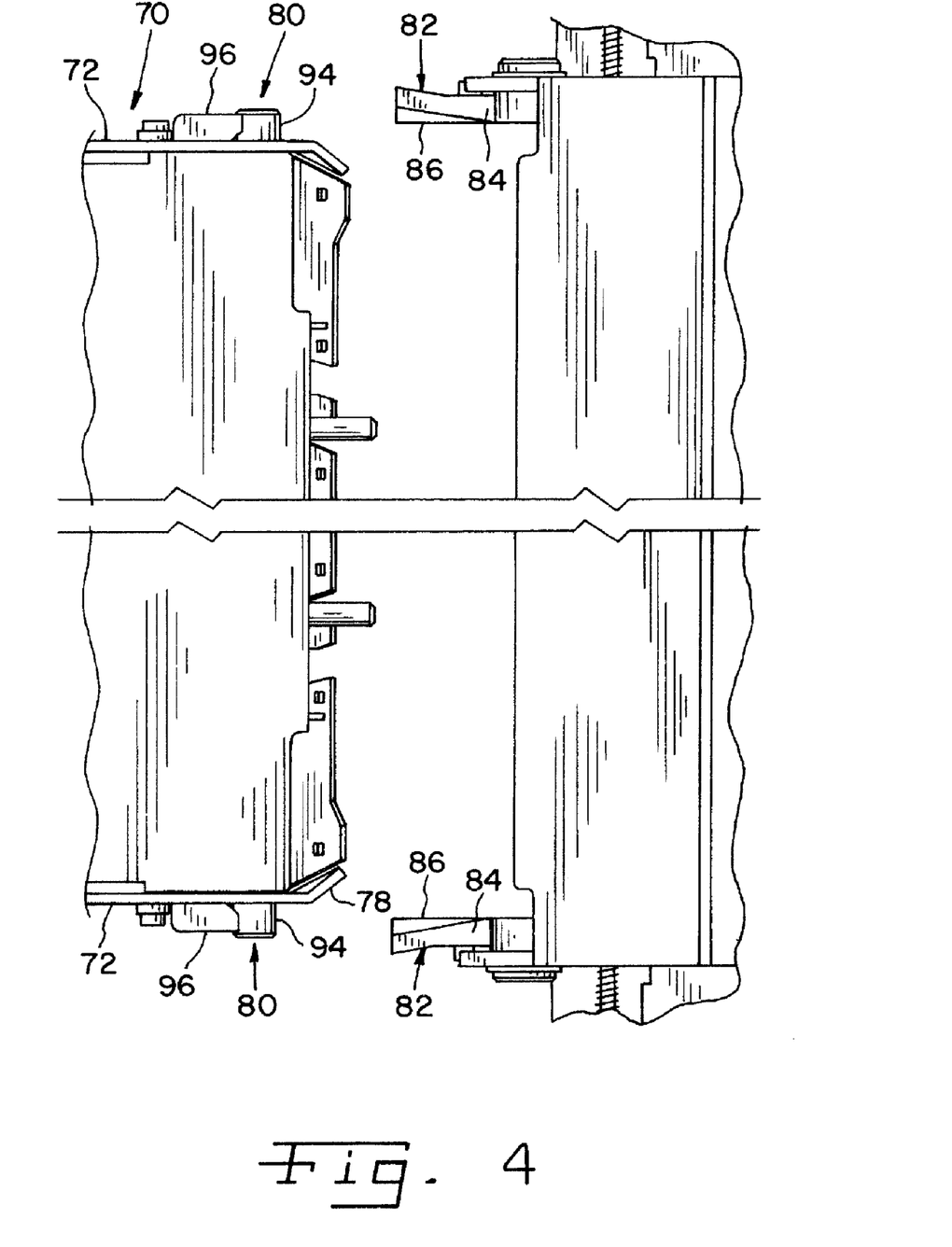
FIG. 4 is a top, fragmentary view of the center conveyor assembly and center platform section shown in FIG. 3.

Referring to FIG. 3, center platform section 16 includes a removable center conveyor assembly 70 which is positioned between the pair of side belts (one of which is shown and labeled 32B) carried by respective side platform sections 18 and 20. Each side platform section 18 and 20 carries cutterbar assembly 22, which also spans across center platform section 16. When center conveyor assembly 70 is in the installed position, cutting platform 12 may be used as a harvester, and when in an uninstalled position, cutting platform 12 may be used as a swather or windrower.

Center conveyor assembly 70 includes a sub-frame 72 which carries at least a pair of rollers (not specifically shown), which in turn carry a center belt 32A. The rear end 74 of center conveyor assembly 70 is coupled with a feeder drum 76 positioned at the front of feeder housing 14. The front or leading edge 78 of center conveyor assembly 70 carries at least one alignment device 80 which mates with a corresponding alignment device 82 carried by center platform section 16.

Referring to FIGS. 4-9, center platform section 16 includes at least one alignment device 82 in the form of a pair of vertical alignment guides. Each vertical alignment guide 82 has a generally triangular shape when viewed from the side, and includes a top flange 84, a spaced apart diverging bottom flange 86, and a seat 88 at an apex between top and bottom flanges 84 and 86. Bottom flange 86 defines an upwardly sloped ramp which guides the alignment device 80 at the leading edge of center conveyor assembly 70. Each vertical alignment guide 82 is also slightly laterally flared (see FIG. 4) which assists in side to side alignment between center conveyor assembly 70 and center platform section 16.

Figure 5:
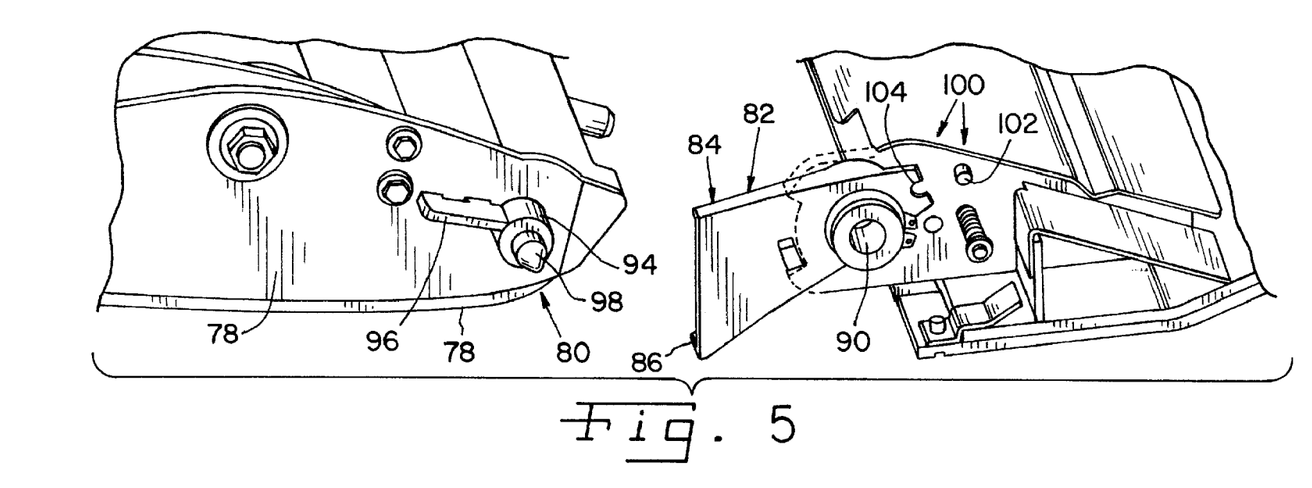
FIG. 5 is a fragmentary, perspective, partially phantom view of the center conveyor assembly and center platform section shown in FIGS. 3 and 4.
Figure 6:
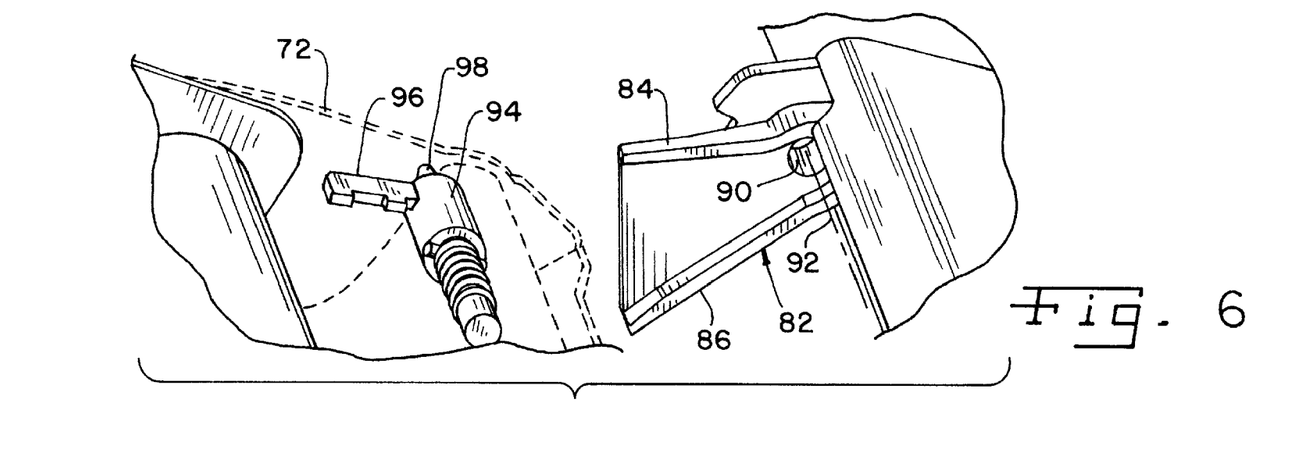
FIG. 6 is another fragmentary, perspective, partially phantom view of the center conveyor assembly and center platform section shown in FIGS. 3-5.
Figure 7:
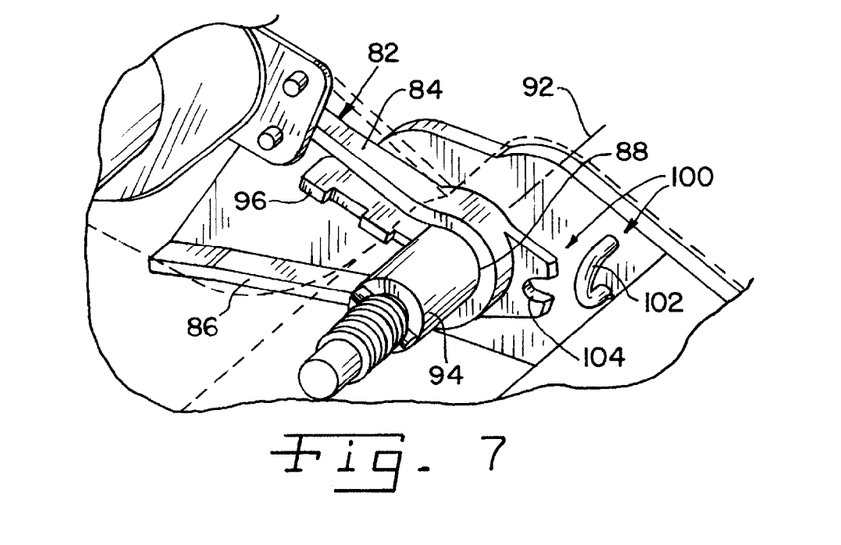
FIG. 7 is yet another fragmentary, perspective, partially phantom view of the center conveyor assembly and center platform section shown in FIGS. 3-6.

Vertical alignment guide 82 also includes a latch hole 90 which extends through a side wall of vertical alignment guide 82 at a position adjacent to seat 88, and defines an axis of rotation 92 about which vertical alignment guide 82 may pivot through a fixed angular range. FIGS. 5 and 6 show the vertical alignment guide 82 when positioned at a downward angle of about 20 degrees prior to connection with alignment device 80, and FIGS. 7 and 8 show the vertical alignment guide 82 when rotated upward upon seating of alignment device 80.

In the specific embodiment of FIGS. 3-8, the at least one alignment device 80 includes a pair of guide pins 94 and corresponding guide plates 96. Each guide pin 94 extends laterally from a respective forward, lateral edge 78 of center conveyor assembly 70. Guide pins 94 have an outside diameter which is sized to seat within a corresponding seat 88 of a vertical alignment guide 82. Each guide plate 96 extends rearwardly and generally tangent from a top edge of a corresponding guide pin 94. Guide plates 96 engage top flange 84 of a respective vertical alignment guide 82 and rotate vertical alignment guides 82 to the upper position shown in FIGS. 7 and 8 when guide pin 94 is fully seated in seat 88.

A pair of latch pins 98 are slidably disposed in a bore (not numbered) formed in a respective guide pin 94. Each latch pin 98 passes through a respective guide pin 94 and extends into a respective latch hole 90. Latch pins 98 are preferably spring biased (FIGS. 5-7) into a respective latch hole 90 when guide pin 94 is in the seated position in seat 88.

Figure 8:
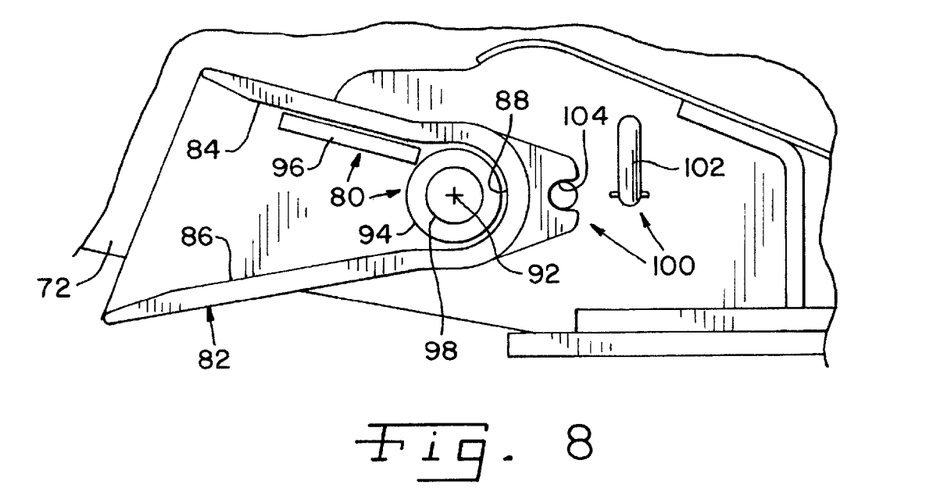
FIG. 8 is a side view illustrating the alignment device of the center conveyor assembly in a seated position within the vertical alignment guide of the center platform section.
Figure 9:
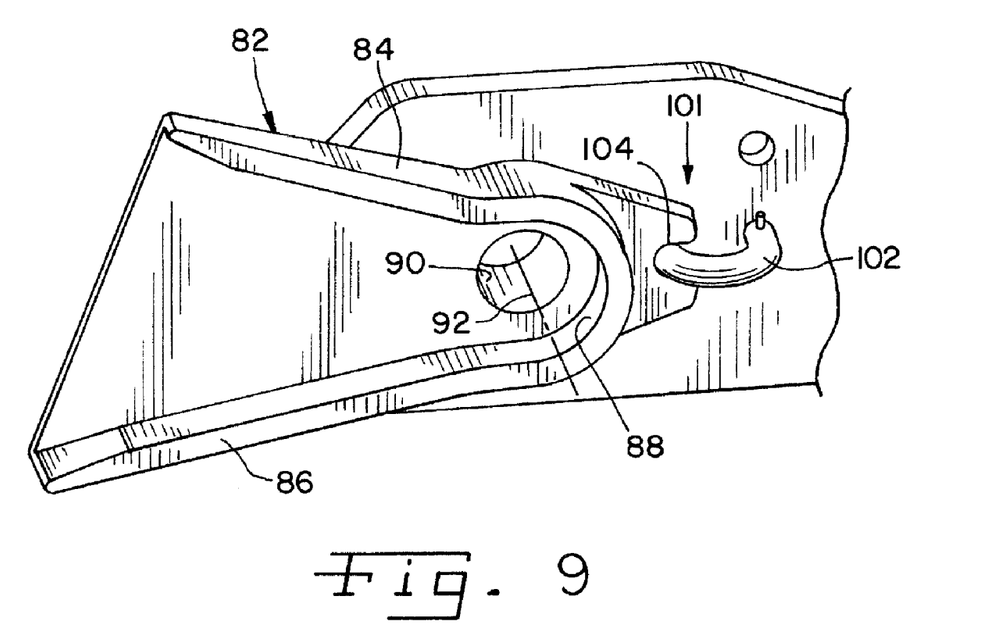
FIG. 9 is a perspective view of the vertical alignment guide in a locked position.

Referring to FIGS. 8 and 9, the angular position of each vertical alignment guide 82 may be locked in place using a lock 100. In the illustrated embodiment, each lock 100 includes a spring biased pin 102 which engages with a recess 104 formed in a corresponding vertical alignment guide 82. FIG. 8 shows pin 102 in the unlocked position, and FIG. 9 shows pin 102 in the locked position. Pin 102 is spring biased (see, e.g., FIG. 5) and can be manually moved from the locked to the unlocked position, or vice versa.

In the embodiment illustrated in FIGS. 3-9, alignment guide 80 includes a guide pin 94 and a guide plate 96. Further, vertical alignment guide 82 includes a top flange 84, bottom flange 86 and seat 88. It is possible, however, that a different type of alignment arrangement can be provided between center conveyor assembly 70 and center platform section 16. For example, it could be possible that the leading edge of center conveyor assembly 70 can have a generally U-shaped nose extending across it's width which fits into a corresponding U-shaped recess positioned behind the cutterbar assembly 22. Further, it is possible that the latching mechanisms for latching center conveyor assembly 70 to center platform section 16 can be of a different form. Additionally, it is possible that the locking mechanisms for locking the angular orientation of vertical alignment guide 82 can be of a different form.

During an attachment procedure, the base unit of agricultural harvester 10 is positioned such that center conveyor assembly 70 mounted to the front of the base unit is in general alignment with center platform section 16 (FIG. 3). The base unit is moved forward (as indicated by arrow 106) until each vertical alignment guide 82 mounted to center platform section 16 engages with a corresponding alignment device 80 mounted to center conveyor assembly 70. When in the seated position, each spring biased latch pin 98 latches within a corresponding latch hole 90 to latch center conveyor assembly 70 to center platform section 16 (FIGS. 7 and 8). When cutting platform 12 is used as a windrower, it may be desirable to hold vertical alignment guide 82 in an up position to avoid dragging on the ground during use. Accordingly, latch pins 102 may be manually pulled, rotated and locked in place within a corresponding recess 104 to lock the vertical alignment guide 82 in the up position. To remove the center conveyor assembly 70 from cutting platform 12, the procedure can be simply reversed.

Having described the preferred embodiment, it will become apparent that various modifications can be made without departing from the scope of the invention as defined in the accompanying claims.

The invention claimed is:

1. A draper cutting platform for use with an agricultural harvester, said cutting platform comprising:
a pair of side platform sections, each said side platform section including a side belt;
a center platform section in an area between said side platform sections, said center platform section including at least one alignment device including a pair of vertical alignment guides having a top flange, a spaced apart diverging bottom flange, and a seat at an apex between said top flange and said bottom flange, and at least one latch; and
a center conveyor assembly removably attached to said center platform section, said center conveyor assembly carrying a center belt, said center conveyor assembly including at least one mating alignment device associated with said center conveyor assembly including a pair of guide pins and further including a pair of guide plates, each said guide plate associated with a respective said guide pin and at least one mating latch.

2. The draper cutting platform of claim 1, wherein each said vertical alignment guide includes a latch hole adjacent said seat, and each said mating alignment device includes a latch pin passing through a respective said guide pin and into a respective said latch hole.

3. The draper cutting platform of claim 2, wherein each said vertical alignment guide is pivotable through a fixed range about an axis of rotation of said latch hole.

4. The draper cutting platform of claim 3, including a pair of locks, each for locking pivotal movement of a respective said vertical alignment guide.

5. The draper cutting platform of claim 4, wherein each said lock includes a spring biased pin.

6. The draper cutting platform of claim 2, wherein each said latch pin is spring biased into a respective said latch hole.

7. The draper cutting platform of claim 1, wherein each said side platform section carries a cutterbar assembly extending across a working width of said cutting platform, said center platform section being positioned behind said cutterbar assembly.

8. An agricultural harvester, comprising:
a feeder housing; and
a cutting platform including:
a pair of side platform sections, each said side platform section including a side belt;
a center platform section in an area between said side platform sections, said center platform section including at least one alignment device including a pair of vertical alignment guides, having a top flange, a spaced apart diverging bottom flange, and a seat at an apex between said top flange and said bottom flange having a top flange and at least one latch; and
a center conveyor assembly attached to said feeder housing and removably attached to said center platform section, said center conveyor assembly carrying a center belt, said center conveyor assembly including at least one mating alignment device associated with said center conveyor assembly including a pair of guide pins and further including a pair of guide plates, each said guide plate associated with a respective guide pin and at least one mating latch.

9. The agricultural harvester of claim 8, wherein each said vertical alignment guide includes a latch hole adjacent said seat, and each said mating alignment device includes a latch pin passing through a respective said guide pin and into a respective said latch hole.

10. The agricultural harvester of claim 9, wherein each said vertical alignment guide is pivotable through a fixed range about an axis of rotation of said latch hole.

11. The agricultural harvester of claim 10, including a pair of locks, each for locking pivotal movement of a respective said vertical alignment guide.

12. The agricultural harvester of claim 11, wherein each said lock includes a spring biased pin.

13. The agricultural harvester of claim 9, wherein each said latch pin is spring biased into a respective said latch hole.

14. The agricultural harvester of claim 8, wherein each said side platform section carries a cutterbar assembly extending across a working width of said cutting platform, said center platform section being positioned behind said cutterbar assembly.

15. A method of attaching a center conveyor assembly to a center platform section of a draper cutting platform, said attachment method comprising the steps of:

positioning a base unit of an agricultural harvester such that a center conveyor assembly mounted to the front of the base unit is in general alignment with a center platform section of the cutting platform;

moving the base unit forward until at least one vertical alignment device including a pair of vertical alignment guides having a top flange, a spaced apart diverging bottom flange, and a seat at an apex between said top flange and said bottom flange mounted to the center platform section engages with a pair of pins on a corresponding pair of guide plates mounted to the center conveyor assembly; and latching the center conveyor assembly to the center platform section.

16. The method of attaching a center conveyor assembly of claim 8, wherein each said vertical alignment guide includes a latch hole adjacent said seat, and each said mating alignment device includes a latch pin passing through a respective said guide pin and into a respective said latch hole.

\* \* \* \* \*